United States Patent
Abdat

(10) Patent No.: US 6,697,803 B2
(45) Date of Patent: *Feb. 24, 2004

(54) GENERATING SEARCHABLE DATA ENTRIES AND APPLICATIONS THEREFORE

(75) Inventor: Mourad Abdat, Nepean (CA)

(73) Assignee: Mosaid Technologies Inc., Kanata (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/272,949

(22) Filed: Oct. 18, 2002

(65) Prior Publication Data

US 2003/0046500 A1 Mar. 6, 2003

Related U.S. Application Data

(63) Continuation of application No. 09/725,876, filed on Nov. 30, 2000, now Pat. No. 6,484,170.

(30) Foreign Application Priority Data

Nov. 30, 1999 (CA) .............................................. 2291310

(51) Int. Cl.⁷ ................................................. G06F 7/02
(52) U.S. Cl. ........................................... 707/6; 711/108
(58) Field of Search ............................... 707/6; 711/108

(56) References Cited

U.S. PATENT DOCUMENTS

| | | | | |
|---|---|---|---|---|
| 3,320,592 A | * | 5/1967 | Rogers et al. ................. 365/49 |
| 3,389,377 A | * | 6/1968 | Cole et al. ..................... 365/49 |
| 4,996,666 A | * | 2/1991 | Duluk, Jr. ..................... 365/49 |
| 5,561,429 A | * | 10/1996 | Halberstam et al. ........... 342/14 |
| 5,758,148 A | * | 5/1998 | Lipovski ......................... 707/6 |
| 5,920,886 A | * | 7/1999 | Feldmeier .................... 711/108 |

OTHER PUBLICATIONS

IBM Technical Disclosure Bulletin, "Storage Management of Linear Lists by Ordinal Numbers," vol. 19, No. 7, pp. 2709–2714, Dec. 1976.*

Wade and Sodoni, "A Ternary Content Addressable Search Engine," IEEE Journal of Solid–State Circuits, vol. 24, No. 4, pp. 1003–1013, Aug. 1989.*

* cited by examiner

Primary Examiner—David L. Robertson
(74) Attorney, Agent, or Firm—Miles & Stockbridge P.C.; John C. Kerins

(57) ABSTRACT

New techniques for generating entries in a content addressable memory (CAM) capable of comparison operations such as "greater than" and "less than" decisions are described. The techniques can be used with binary or ternary CAMs. The number of CAM entries needed to implement such decisions is drastically reduced for both binary and ternary CAMs. In the case of binary CAMs, one or multiple searches are needed to perform the comparisons, while in the case of ternary CAMs a tradeoff between the number of CAM entries and the number of searches can be found. As an example, a method of classifying data networking packets is implemented using the new techniques. A packet classifier based on subfields of a packet header is also described.

22 Claims, 7 Drawing Sheets

| | "Greater than or equal to" a fixed value | "Less than" a fixed value | Two P-bit fields "different" from each other | Two fields "equal" to each other | Two P-bit fields "field 1 greater than field 2" | Two P-bit fields "field 1 less than field 2" |
|---|---|---|---|---|---|---|
| Entries in ternary CAM with one search operation | P-N+M+1 | K | 2P | 2P+1 | 2P | 2P |
| Entries in binary CAM | Dependent on the binary pattern of the fixed value | Dependent on the binary pattern of the fixed value | 2 | 2 | 2 | 2 |
| Number of searches in a binary CAM | Dependent on the binary pattern of the fixed value | Dependent on the binary pattern of the fixed value | P | P (equal on a no match result after the P searches) | P | P |

| Match address | Comparison Result |
|---|---|
| $2k \leq MA < 2k+2P$ | $f1$ is different from $f2$ |
| $2k \leq MA < 2k+2P$ and MA (even address) | $f1$ is greater than $f2$ ($f2$ less than $f1$) |
| $2k \leq MA < 2k+2P$ and MA (odd address) | $f1$ is less than $f2$ ($f2$ greater than $f1$) |
| $MA = 2k+2P$ | $f1$ is equal to $f2$ |

| F1 | F2 | F3 | F4 |
|---|---|---|---|
| 3 bits | 3 bits | 4 bits | 2 bits |

|  | "Greater than or equal to" a fixed value | "Less than" a fixed value | Two P-bit fields "different" from each other | Two fields "equal" to each other | Two P-bit fields "field 1 greater than field 2" | Two P-bit fields "field 1 less than field 2" |
|---|---|---|---|---|---|---|
| Entries in ternary CAM with one search operation | P-N+M+1 | K | 2P | 2P+1 | 2P | 2P |
| Entries in binary CAM | Dependent on the binary pattern of the fixed value | Dependent on the binary pattern of the fixed value | 2 | 2 | 2 | 2 |
| Number of searches in a binary CAM | Dependent on the binary pattern of the fixed value | Dependent on the binary pattern of the fixed value | P | P (equal on a no match result after the P searches) | P | P |

*Figure 2*

| Number of CAM entries | CAM entries | Number of Searches | Example of Masks used for searches |
|---|---|---|---|
| 8 | 1xxx 0xxx<br>0xxx 1xxx<br>x1xx x0xx<br>x0xx x1xx<br>xx1x xx0x<br>xx0x xx1x<br>xxx1 xxx0<br>xxx0 xxx1 | 1 | 0000 0000 |
| 6 | 11xx 00xx<br>00xx 11xx<br>xx1x xx0x<br>xx0x xx1x<br>xxx1 xxx0<br>xxx0 xxx1<br>or | 2 | 0111 0111<br>1000 1000<br>or |
|  | 1xxx 0xxx<br>0xxx 1xxx<br>x1xx x0xx<br>x0xx x1xx<br>xx11 xx00<br>xx00 xx11<br>or |  | 0001 0001<br>1110 1110<br>or |
|  | 1xxx 0xxx<br>0xxx 1xxx<br>x11x x00x<br>x00x x11x<br>xxx1 xxx0<br>xxx0 xxx1<br>or |  | 0011 0011<br>1100 1100<br>or |

Figure 3A

| | | | |
|---|---|---|---|
| | 1x1x 0x0x<br>0x0x 1x1x<br>x1xx x0xx<br>x0xx x1xx<br>xxx1 xxx0<br>xxx0 xxx1<br>or | | 0011 0011<br>1100 1100<br>or |
| | ..... | | ..... |
| 4 | 11xx 00xx<br>00xx 11xx<br>xx11 xx00<br>xx00 xx11<br>or | 3 | 0111 0111<br>1001 1001<br>1110 1110<br>or |
| | 111x 000x<br>000x 111x<br>xxx1 xxx0<br>xxx0 xxx1<br>or | | 0111 0111<br>1011 1011<br>1100 1100<br>or |
| | 1xxx 0xxx<br>0xxx 1xxx<br>x111 x000<br>x000 x111<br>or | | 0011 0011<br>1101 1101<br>1110 1110<br>or |
| | ..... | | ..... |
| 2 | 1111 0000<br>0000 1111 | 4 | 0111 0000<br>1011 1011<br>1101 1101<br>1110 1110 |

Figure 3B

(Continuation of Figure 3A)

| Comparison | Ternary CAM entries for the compared fields |
|---|---|
| F3≥12 | 11xx |
| F3<8 | 0xxx |
| 8≤F3<12 | 10xx |
| F4=2 | 10 |
| F1=1 | 001 |
| F1=F2<br>F1<F2 | F1  F2<br>1xx  0xx<br>0xx  1xx<br>x1x  x0x<br>x0x  x1x<br>xx1  xx0<br>xx0  xx1<br>xxx  xxx |

*Figure 6*

| Addresses | F1 | F2 | F3 | F4 | Class |
|---|---|---|---|---|---|
| 0 | xxx | xxx | 10xx | xx | 1 |
| 1 | xxx | xxx | 11xx | 10 | 2 |
| 2 | 001 | xxx | 11xx | xx | 2 |
| 3 | 1xx | 0xx | 11xx | xx | 4 |
| 4 | 0xx | 1xx | 11xx | xx | 5 |
| 5 | x1x | x0x | 11xx | xx | 4 |
| 6 | x0x | x1x | 11xx | xx | 5 |
| 7 | xx1 | xx0 | 11xx | xx | 4 |
| 8 | xx0 | xx1 | 11xx | xx | 5 |
| 9 | xxx | xxx | 11xx | xx | 3 |
| 10 | 1xx | 0xx | 0xxx | xx | 4 |
| 11 | 0xx | 1xx | 0xxx | xx | 5 |
| 12 | x1x | x0x | 0xxx | xx | 4 |
| 13 | x0x | x1x | 0xxx | xx | 5 |
| 14 | xx1 | xx0 | 0xxx | xx | 4 |
| 15 | xx0 | xx1 | 0xxx | xx | 5 |
| 16 | xxx | xxx | 0xxx | xx | 3 |

*Figure 7*

GENERATING SEARCHABLE DATA ENTRIES AND APPLICATIONS THEREFORE

CROSS REFERENCE TO RELATED APPLICATION

This is a continuation of application Ser. No. 09/725,876, filed on Nov. 30, 2000 now U.S. Pat. No. 6,484,170.

FIELD OF INVENTION

The invention generally relates to performing comparison operations between or among digital data and generating data entries to be used for such operations. In particular, it is directed to computer processes, network communication systems, pattern recognition systems, or any system in which data entries are generated to be used for comparison operation with incoming data or with each other in order to make content-based decisions.

BACKGROUND OF INVENTION

There are many areas of digital data processing in which two or more digital data are compared with each other to derive relationships between or among them. Some examples are to classify data according to criteria, to parse packet data to identify their protocol type, and to perform database searches to name a few.

Data network communication systems are an area where these operations can be described in more detail. The increasing network traffic and the diversity of services provided by today's networks, require some distinction to be made for some type of services and packets. For example, network requirements for voice or video packet transmission are not the same as for File Transfer Protocol (ftp) application packet, or network management packets. The recent introduction of Quality of Service (QoS) and Class of Service (CoS) concepts in networks, are making packet classification more critical than it was in the past. In order to be able to prioritize and provide a required quality of service for a given packet, the packet has to be recognized as requiring certain QoS or CoS. Packet classification is an important step in providing QoS and CoS based services. The packets are classified according to the values contained within their headers, which indicate the type of their flow. The more precise the packet analysis, the better the classification. Many encapsulated headers may be looked-up to make a decision about the packet class.

In general, packet classification involves first identifying different incoming network packet headers and more specifically fields contained within these headers. The second step involves comparing the different header fields to fixed values or comparing the fields between themselves. In differentiated service systems, i.e., system implementing CoS and QoS whereby the type of service can be differentiated in order to increase the processing rates, the time allocated for packet header processing has to be minimized.

Many conventional packet classification techniques involving software are currently used or under development, which perform classifications using binary trees or accelerated search algorithms. These conventional techniques use a "perfect match" approach (exact equality comparison) wherein the search data are compared with a fixed value and either an exact match is found or a mismatch or miss is detected.

Recent advances in content addressable memories (CAMs) have provided an attractive hardware alternative for implementing such packet classification tasks to the conventional software techniques. CAMs perform parallel searches of specified data vs. stored data to output a match or a mismatch result designated by an address (in the case of a match). CAM cell structure can be either binary or ternary. Binary CAM cells can store either a logic "0" or "1", while ternary CAM cells can store a logic "0", "1", or a "don't care" state. A "don't care" state or value, also denoted by "x" means that the value can be either a "0" or a "1". Typically, these three states are encoded using two bits. For example, the value "0" can be stored as "00", the value "1" as "01" and the "don't care" value as "10" with the fourth case "11" being an unused state.

Generally, both binary and ternary CAMs have mask registers that can be used during search operations to ignore or "mask" some of the bits for comparisons. In this description, a bit in the mask bit register that is set to "0" means that the corresponding bit in the input data (or the key) is to be compared to the corresponding bit in the CAM entries. A mask bit that is set to "1" in the mask bit register, means that the result of the comparison of the corresponding bit in the input data (key) with the corresponding bit in the CAM entries does not matter. In the case of ternary CAMs, bits that are set to "don't care" value in CAM entries, will always match the corresponding bits in the input data independently of the mask value for these bits. In the remainder of the description, concepts will be equally applicable to both binary and ternary CAMs unless otherwise specified.

The introduction of masking in binary CAMs and "don't care" values in ternary CAMs allow comparisons other than the "equality". Comparisons such as "greater than", "less than", and "inequality" to a fixed value, as well as comparing two fields of incoming data can be implemented. Mask register and "don't care" features are used in several prior art implementations. For example, U.S. Pat. No. 5,920,886 Jul. 6, 1999 Feldmeier uses these features to implement hierarchical address filtering and translation. In this prior art reference, masks and the "don't care" values are used to perform comparisons extending the "equality" relationship but it uses a priority fields to represent hierarchical levels.

U.S. Pat. No. 4,996,666 Feb. 26, 1991 Duluk, Jr. describes a CAM system for performing fully parallel magnitude comparisons between 'stored and input data based on a specific hardware implementation. The proposed CAM implementation is also capable of performing multiple comparisons on multiple fields of the CAM entries in one clock cycle. Comparisons such as "equality", "less than", "less than or equal to", "greater than", "greater than or equal to", "inequality", and "don't care" (field ignored) can be performed. The results of the different comparisons are stored in flag bits associated with each CAM entry. The more flag bits the CAM' has, the larger is the number of comparisons and fields of the CAM. However, the proposed solution is a custom hardware solution requiring significant area. Furthermore, the patent fails to describe techniques of flexibly generating the CAM entries.

U.S. Pat. No. 3,320,592 May 16, 1967 Rogers et al. also describes a hardware implementation of a CAM based comparisons other than equality in one cycle. This implementation supports binary data storage only and is hardware-specific.

U.S. Pat. No. 3,389,377 Jun. 18, 1968 Cole describes a CAM capable of performing "greater than" and "less than" comparisons using a bit-sequential algorithm where bits of a field to be compared are scanned from the most significant bit to the least significant bit. This reference describes only binary CAMs with no masking capabilities with hardware-specific modifications to conventional CAMs. A non-flexible sensing scheme is also described which further constrains the flexibility of CAMs.

In summary, all these prior art solutions describe either software implementations or customized hardware solutions for performing comparison operations. In addition, none of the above prior art references describes a flexible and efficient way of generating searchable entries intended to minimize the number of entries required for performing the search and compare functions.

The invention therefore addresses techniques of generating searchable data entries in a storage medium. The invention also resides in techniques of performing comparison operation between an unknown value, against a fixed value or between fields within a digital stream. The present invention does not require any specific hardware implementation except the ability to use masks during a search operation, or alternately the ability to have "don't care" states stored. The storage medium can be of the type of CAM used; i.e. binary or ternary SRAM or DRAM-based CAMs can be used to implement the present invention.

SUMMARY OF INVENTION

Briefly stated, the invention is directed to a method of generating data entries to be written in a storage medium which supports comparison-type operations. The method includes the steps of identifying a reference value having a predetermined number P of binary bits and identifying a comparison-type indicator indicating the type of comparison operation which includes "greater than", "less than" "equal to", "greater than or equal to" and "less than or equal to". The method includes further steps of determining the bit pattern of the reference value and generating a set of data entries to be written in response to the comparison-type indicator and the bit pattern. In further aspect of the invention, the storage medium is binary CAM or ternary CAM.

In accordance with another aspect, the invention is directed a method of performing a comparison-type operation against the reference value by using a CAM. The method comprises steps of searching for the reference value in a storage medium which contains the data entries generated responsive to the bit pattern and the comparison-type indicator to produce a result which includes no match, a match and a multiple matched, and determining the comparison relationship against the reference value in response to the result.

In accordance with a further aspect, the invention is directed to a method of generating data entries to be written in a storage medium which supports a comparison-type operation between two fields within a digital datum, one field being P binary bits long, the other being S binary bit long and P and S being positive integers. The method comprises steps of identifying a comparison-type indicator indicating the type of comparison operation which includes one field being "greater than", "less than" "equal to", "greater than or equal to" and "less than or equal to" the other field and generating a set of data entries of at least P+S bits long to be written in response to the comparison-type indicator, each of the data entries comprising two subentries of at least P and S bit long respectively.

In yet a further aspect, the two fields between which a comparison-type operation is performed can be from the same digital data stream. In one embodiment, the digital stream is a header of communications packet and the method of the invention can be applied to parse (classify) the packet by performing comparison operations to the fields within the header.

In further aspect, the invention is directed to electronic systems for performing variety, of comparison-type operations.

BRIEF DESCRIPTION OF DRAWINGS

FIG. 2 is a table identifying the numbers of entries and search operations required for various decisions according to the invention.

FIGS. 3A and 3B are tables showing distribution of CAM entries and number of searches for a comparison of two 4-bit fields (equal decision excluded) according to an embodiment of the invention.

FIG. 6 shows ternary CAM data entries used for comparison operations illustrated in FIG. 5.

FIG. 7 illustrates the initialized contents of the CAM for implementing packet classification process of FIG. 5.

DETAILED DESCRIPTION OF PREFERRED EMBODIMENTS OF INVENTION

Figures 1, 4:
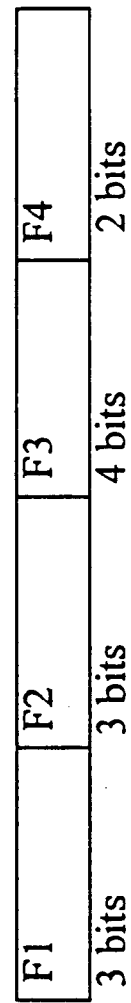
FIG. 1 is a table identifying magnitude comparison decisions between two fields according to an embodiment of the invention.
FIG. 4 is a table showing four fields of 2, 3 and 4 bits long within a digital data stream which is used to illustrate comparison operations performed among fields.

There are many applications in which data comparison operations are necessary. In data network communication applications; for example, data packet headers and/or fields within the headers are compared to stored values or between themselves for classification and subsequent processing. Typical comparison operations of interest are:

(1) compare a comparand to a fixed value for exact equality, (2) compare a comparand to a fixed value for "greater than", "less than", "greater than or equal to", "less than or equal to", or inequality relationship, (3) compare two fields of a comparand for equality, "greater than", "less than", "greater than or equal to", "less than or equal to" or inequality relationship.

Implementing operation (1) with a CAM requires first storing the fixed value in a CAM entry and some point in time later, when required, receiving incoming data, searching and comparing the incoming data to the CAM entries in search of a match or a mismatch result. For operations (2) and (3), several entries combined with one or multiple searches in the CAM may be needed to make the decisions. One way of implementing operations (2) and (3), is to write all the possible relevant values in the CAM; i.e. all the binary combinations. For example for operation (2) above, consider a comparand C, which has to be classified into two classes depending on whether it is greater or less than a fixed value V. This can be done by first writing V entries into the CAM (all the values which are less than V). Then, when a search is performed, if any match occurs, then C is "less than" V, otherwise, if no match occurs (typically referred to as a mismatch) then C is "greater than or equal to" V. Although a one-search operation is enough to determine the outcome of this comparison, this implementation is expensive in terms of CAM space. Conventional software tree search implementations are also too slow. For large values of V in the above mentioned example, a large number of CAM entries are needed to store all the possible values which are less than V. Furthermore, even if V is not too high but the field to be compared is combined with other fields to form the CAM entries, the required number of CAM entries grows very quickly.

For another example related to operation (3) described above, consider 2 n-bit fields f1 and f2 of an incoming data packet header which are to be compared to determine if they are equal or unequal (their exact value is unknown although the number of bits per field is known). Since the two fields can have any one of a number of values, storing all possible combinations covering the case where f1 is equal to f2 requires $2^n$ CAM entries. "Inequality" can therefore be deduced if after a search operation a no-match results. If for consistent implementation reasons, the "inequality" result is to be determined based on a match result, then representing all the combinations where the first field is different from the second field requires $2^n$ ($2^n-1$) entries in the CAM. Each value of f1 is combined with the ($2^n-1$) possible values of f2. Since f1 has $2^n$, the total number of entries required is $2^n$ ($2^n-1$).

In accordance with an embodiment of the invention, comparison operations consisting of:

(1) a comparand C being "greater than", "greater than or equal to", "less than", and "less than or equal to" a fixed value V, (i.e., C>, $\geq$, <, $\leq$, V), and (2) one comparand field f1 being "greater than", "greater than or equal to", "less than", and "less than or equal to" as well as "equal to" and "unequal to" another comparand field f2 (i.e. f1>, $\geq$, <, $\leq$ f2).

can be implemented using a binary or a ternary CAM. Fewer CAM entries are needed to make a decision than in conventional approaches technologies. In addition, the embodiment is not restricted by hardware implementation details, making the solution much more flexible. In case a binary CAM is used for the implementation, multiple searches are needed to perform the comparison. If a ternary CAM is used to implement the invention, only a single search operation is required, though multiple search implementations are also possible. Therefore, if area constraints are more important than speed of the search operation, multiple searches are used in which case the number of memory entries can be further reduced in proportion to the number of searches.

A detailed description of the generating of entries based on the two comparison type operations described above will now be presented with reference to the accompanying drawings.

(A) Comparison with a Fixed Value (Comparand C>, $\geq$, <, $\leq$, V Fixed Value V)

Provided that C can represent either an entire CAM entry or a field within a CAM entry, the number of entries that are needed in the CAM for such operations depends on:

the pattern of the binary representation of the fixed value V, and the precision of the comparand, i.e. the number of bits P used to represent comparand C The pattern of the binary representation of V can be divided into three categories:

V is a power of 2

V is not a power of 2 but has a group of contiguous 1's

V is not a power of 2 and has a number of non-contiguous groups of 1's.

Each of these categories requires more entries to represent the possible values for V. Taking the first category, if V is 1024, which is a power of 2, i.e. $1024=2^{10}$ and if the precision used is 16 bits (i.e. P=16, n=10), then V would be represented in binary form as 0000010000000000. The CAM entries which correspond to all 16-bit values which are "greater than or equal to" V would be denoted in this case as follows:

xxxxx1xxxxxxxxxx
xxxx1xxxxxxxxxxx
xxx1xxxxxxxxxxxx
xx1xxxxxxxxxxxxx
x1xxxxxxxxxxxxxx
1xxxxxxxxxxxxxxx More generally, this would be denoted as x . . . x1x . . . (m times) . . . x where x is a "don't care" and m varies between (n+1) and P. In this specific case, with P=16 and n=10, m=from 11 to 16. Therefore, the number of entries in the CAM is (P−n). A match resulting from 'a search of these entries would indicate a comparand which is greater than or equal to the fixed value $V=2^{10}$. A mismatch would indicate the comparand is less than V.

If a ternary CAM implementation is used, since "don't care" values can be directly stored, this comparison can be performed in a single search operation without a mask, provided that the above outlined multiple entries are used to store all the possible combinations in the CAM. If multiple searches are permitted, the number of entries in the ternary CAM can be reduced, by increasing the number of searches that are needed to perform the comparison. This is done by merging several entries into one and producing masks corresponding to the different searches. As a result, there is a tradeoff between the number of entries and the number of searches needed to perform a comparison.

If a binary CAM implementation is used, since "don't care" values cannot be stored, the comparison is performed by doing several searches with different masks. The value to be stored in the binary CAM contains only is (1 . . . P times . . . 1). If a 0 bit in the mask indicates that the corresponding bit in the entries is not masked and a 1 bit indicates that the corresponding bit is masked. The masks to use for the searches are as follows:

1111101111111111 (n times "1")
1111011111111111
1110111111111111
1101111111111111
1011111111111111
0111111111111111 (P−1 times "1")

or more generally,

1 . . . 1101 . . . n times . . . 1
1 . . . 101 . . . n+1 times . . . 1
. . .
101 . . . p−2 times . . . 1
01 . . . p−1 times . . . 1

The number of masks, which corresponds to number of searches is P−n (in the case described above, the number of searches would be 6 with one mask per search). The searches can be performed in any order and each search is performed with a different mask. It is worth noting that if a bit is masked in all the masks used for different search operations (such as the n least significant bits in the previous example), its value in the entry is not important, it can be either 0 or 1. The comparison decision is made on the first search which matches. Therefore, at most, (P−n) searches are needed.

Conventionally, when using masks, a mask bit set to 1 means that the corresponding bit in the CAM entries is ignored during search operation for both types of CAMs. The corresponding bit is written as a "don't care" during write operations in a ternary CAM. A mask bit set to 0 means that the corresponding CAM entry symbol is not masked. It is compared to incoming data during search operations and the corresponding input data bit is written as is to the CAM during write operations in a ternary CAM. This rule may be inverted to a 1 symbol meaning the bit is not masked and a 0 meaning that the corresponding bit is masked. In this case the masks given in this invention have to be inverted (0s to 1s and 1s to 0s: complement to 1 to get the equivalent masks).

To perform the comparison "less than" a similar approach can be followed. Any values that are less than $2^n$ have the form: 0 . . . 00x . . . n times . . . x. For a binary CAM, the entry has to have its P–n upper bits set to 0. The other n bits can take any value, they are not relevant since they are masked during the search. One search operation is needed with a mask having the form: 0 . . . 001 . . . n times . . . 1. A match in a search indicates a comparand is less than the fixed value $2^n$.

In the case of a ternary CAM, one entry in the CAM is needed. It is 0 . . . 00x . . . n times . . . x. Only one search operation without any mask (void mask with all 0's) is sufficient to perform the comparison. A match in a search indicates a comparand is less than the fixed value $2^n$.

Similar approaches can be followed for other comparisons such as "greater than" and "less than or equal to".

It is to be noted that since the class of values that are "greater than or equal to" a fixed value is the interval between the fixed value and the maximum value that can be coded, the number of CAM entries for its identification depends on the precision being used. By setting any bit to the left of the most significant bit to a 1, a CAM entry is obtained.

The second category of values represents the values that are not a power of 2 but contain one contiguous group of 1s. Consider the value: 1536. The binary representation of this value is: 0 . . . 011000000000 (one group of contiguous 1s, 0 0-gaps). The values that are "greater than or equal to" 1536 have one of the following representations:

x . . . x11xxxxxxxxx
x . . . 1xxxxxxxxxxx
1x . . . xxxxxxxxxxx

The values that are "less than" 1536 have one of the following representations:

0 . . . 00xxxxxxxxxx, [0, 1023]
0 . . . 010xxxxxxxxx, [1024, 1535]

In the case of a ternary CAM, entries to be stored are the same as the ones represented above. One search operation is sufficient to perform the comparisons. A match indicates that a comparand is "greater than or equal to" 1536 in the first case, and it is "less than" 1536 in the second case.

For a binary CAM, the CAM entry for the "greater than or equal to" comparison is 11 . . . 11111111111. The lower 9 bits can be set to any value (0 or 1), they are masked during the search operations.

The masks that are to be used during the search operations are:

1 . . . 100111111111
1 . . . 011111111111
. . .
01 . . . 111111111111

The order of the searches is not important. The "greater than or equal to" decision is made on the first match.

Continuing with a binary CAM, the "less than" comparison can be performed with three entries in the CAM and one search operation. The CAM entries are:

0 . . . 001000000000
0 . . . 000000000000
0 . . . 010000000000

The nine least significant bits can be set to an arbitrary value, since they are masked during the search operation. The mask to be used during the search is:

0 . . . 0111111111.

The third category of values is those that contain non-contiguous 1 bits. Consider the value 1501, which has the binary representation: 0 . . . 010111011101 (3 0-gaps). To find the representation of all the values that are "greater than or equal to" this value, it is not sufficient to set all the 0, bits to x ("don't care"). For example, x . . . x1x111x111x1 does not cover all the values that are "greater than or equal to" 1501. The values that are "greater than or equal to" 1501 have one of the following forms:

x . . . x11xxxxxxxxx
x . . . x101111xxxxx
x . . . x1011101111x
x . . . x10111011101
x . . . 1xxxxxxxxxxx
. . .
1x . . . xxxxxxxxxxx The values that are "less than" 1501 have one of the following forms:

0 . . . 00xxxxxxxxxx [0,1023]
0 . . . 0100xxxxxxxx [1024, 1279]
0 . . . 01010xxxxxxx [1280, 14071]
0 . . . 010110xxxxxx [1408, 1471]
0 . . . 01011100xxxx [1472, 1487]
0 . . . 010111010xxx [1488, 1495]
0 . . . 0101110110xx [1496, 1499]
0 . . . 010111011100 [1500]

The implementation of the decisions in a ternary CAM can be achieved directly from the previous representation with one search operation. The number of entries can be reduced, by merging some of them. This increases the number of searches that are needed.

The implementation is more complicated in the case of a binary CAM. Care must be taken as to which masks to use. Unwanted values may match even if they do not belong to the class identified by the comparison. Some rules for making the decision on the comparison result, depending on the match result and the matched entries. For example, for the "less than" 1501 comparison, the binary CAM entries have the form shown above as in the case of a ternary CAM. The 'x' symbols ("don't care") are replaced by any symbol 0 or 1. The masks to use are deduced from the previous representations and are:

0 . . . 001111111111
0 . . . 000011111111
0 . . . 000001111111
0 . . . 000000111111
0 . . . 000000001111
0 . . . 000000000111
0 . . . 000000000011
0 . . . 000000000000 (no mask)

When searching with these masks, not all matches will result in a "less than" decision. For example, with mask #1, only if the first entry has matched, the value is "less than" V. The same goes with mask #2, only if the first and second entries have matched, the value is "less than" V.

It is important to note that effectively a binary CAM capable of using masks for search operations and a ternary CAM capable of storing "don't care" states are functionally equivalent.

In the case of a ternary CAM, it is worth mentioning that each entry in the CAM for the "less than" comparison identifies a unique interval as shown in the above illustration. An entry for the "greater than or equal to" operation may overlap with the values identified by another entry for the same operation. The intervals represented by an entry corresponding to the "greater than or equal to" comparison are not continuous. It is clear that since a "less' than" result is the same as the logical inverse of "greater than or equal to" and vice versa, one of these operations can be used as a decision for another.

Although only some comparison operations have been described, it should be clear to those skilled in the art, that similar approaches can be used to perform other comparison operations not specifically described but supported by state-of-the-art CAMs.

Generating CAM Entries

A method for generating. CAM entries and masks for the above mentioned operations according to an embodiment of the present invention will now be described. In the case of ternary CAMs, values and masks generated according to this method are used to write the ternary entries to the CAM. In the case of binary CAMs, the values to be written can be deduced from the ternary entries, while the masks are used for the different searches.

(a) Generating CAM Entries for "Greater Than or Equal to" and "Greater Than" a Fixed Value Comparisons In the case where there are no 0-gaps in the binary representation of the comparison value (only contiguous 1s), then the first entry in the CAM is obtained by setting all the 0 bits of the fixed value to "don't care" state. The other entries are obtained by setting one-by-one the bits that are to the left of the most significant bit to 1 and all the others to "don't care" state. With a P-bit precision, a comparison value of N significant bits (bit N is most significant 1) needs P–N entries in the CAM to perform the "greater than or equal to" operation.

In the case where there are 0-gaps in the representation of the comparison value, the first step is 'to set all the bits to the left of the most significant bit to "don't care" state. To generate the first entry of the CAM, the first 0 to the right of the most significant bit is set to 1 and the remaining bits to the right are set to "don't care" value. To generate the next entry, looking back at the comparison value, the second 0 to the right of the most significant bit is located and set to 1 while, as in the previous case, all the bits to the right of this bit are set to "don't care". With each iteration stepping bit-by-bit from the most significant bit to the current bit being considered, the original bits between the most significant 1 and the current bit are preserved. This process is repeated until there are no 0-gaps left. Once this process has, been completed, the other remaining entries are generated in a manner similar as in the first step, i.e. setting one-by-one the bits to the left of the most significant bit to] and all the remaining bits to the right "don't care" state.

In general, for a precision of P bits, a fixed comparison value with N significant bits (bit N is the most significant]) and a total of M 0's in the 0-gaps, (P–N+M) CAM entries are needed to identify the "greater than or equal to'" values. For the "greater than" comparison, the entries are the same as in the "greater than or equal to" minus the entry identifying the fixed value itself.

Any algorithm or scanning order can be used to, generate the entries and masks. These algorithms can be implemented in. software, hardware or a combination of both. The following shows one possible implementation, according to an embodiment of the invention, which automatically determines the CAM entries (both data and mask) for a "greater than or equal to" comparison against a fixed value V coded in P bits:

Determine the rank (K) (or bit position) of the most significant bit in V

Determine the number of significant 0s in V (i.e. to the right of the most significant 1 bit)

Generate the first entries by setting one-by-one the bits between K+1 and P (inclusive) to 1 (the other bits will be masked)

Generate the corresponding masks by setting one-by-one the bits between K+1 and P (inclusive) to 0 and all the other bits to 1

Generate the remaining entries by scanning bit-by-bit, the 0 bits between the most significant 1 and the least significant bit of V, setting that 0 to 1 and keeping the original values of the bits of V between modified one and the most significant 1 in V Generate the corresponding masks for the previous entries by setting the bits from the most significant 1 of V to the current modified bit to 0, and all the other bits to 1

Adjust the entries if the equal decision is included in the comparison

Two tables are generated within the CAM, one containing the values and one containing the masks. The masks are used to write the "don't care" symbols in the case of ternary CAMs. It should be noted that CAMs very often represent a binary storage means. The masks are used for the different searches in the case of binary CAMs.

As mentioned earlier, for the "greater than" comparison, the same implementation can be used but the entry and mask identifying the equal decision have to be removed from the tables.

(b) Generating CAM Entries for "Less Than or Equal to" and "Less Than" a Fixed Value Comparisons In the case where the binary representation of the comparison value has only contiguous 1s (no 0-gaps), the entries for the "less than" operation are first identified by setting all the bits which are to the left of the most significant bit to 0. Successively, the 1s in the binary representation are set to 0 and the bits to the right of this working bit are set to a "don't care" value. The bits from the most significant bit to the current bit keep their original value (which is 1 in this case). A number with N contiguous 1s in its representation will give N entries in the CAM for the "less than" operation.

In the case where the binary representation has 0-gaps, the bits to the left of the most significant bit 1 are set to 0. To find the first entry in the CAM, we look for the first 1 (most significant) in the binary representation. This bit is inverted to 0 and all the bits to the right are set to "don't care" value. The process is repeated until the last 1 (least significant 1). The bits between the most, significant bit and the current bit 1 being set to 0 are set to their original values in the comparand. In this case, for a comparison value which has N 1s in its binary representation, N entries in the CAM are needed to identify the "less than" class of values.

For the "less than or equal to" comparison, the entries are the same as in the "less than" case but are augmented by one entry identifying the fixed value itself. This augmentation can be by adding a new entry or just by extending the "don't care" bits to include the fixed value.

Any algorithm or scanning order can be used to generate the entries and masks. It can be achieved in software, hardware or a combination of both. The following shows one possible implementation, according to an embodiment of the invention, which automatically determines the CAM entries (data and mask) for a "less than or equal to" operation against a fixed value V coded on P bits:

For each "1" bit in V do the following:

Generate an intermediate bit_val having a "1" in the same rank position as the current rank (rank of the current "1" and all other bit set to "0" (can be accomplished by shifting in a single "1" from the least significant bit to the rank of the current "1" being considered)

Set the current CAM entry to the result of the V-bit_val

Set the current mask to the result of bit_val−1.

For example, for the number 1501, or 0 . . . 010111011101, the first CAM entry would be obtained by locating the most significant '1' bit in V. which in this case is in rank position 11 (as underlined 0 . . . 0$\underline{1}$0111011101), and generating the intermediate bit_val which would in this case be 0 . . . 0$\underline{1}$0000000000, and then subtracting bit_val from V to obtain, 0 . . . 0$\underline{1}$0111011101 V 0 . . . 0$\underline{1}$0000000000 (bit_val)

equals 0 . . . 0$\underline{0}$0111011101 as the current CAM entry, and the current mask would be 0 . . . 010000000000 (bit_val)

minus 0 . . . 000000000001 equals 0 . . . 011111111111 as the current mask.

This process is then repeated for the next '1' bit in V, i.e. 0 . . . 010$\underline{1}$11011101 and an entry and mask are generated in the same way as described above.

Two tables are generated, one containing the values and one containing the masks. The masks are used to write the "don't care" symbols in the case of ternary CAMs. They are used for the different searches in the case of binary CAMs.

It is worth noting that the previous two algorithms can be combined to generate both entry types.

(B) Comparison Operations Between Two Fields

According to further embodiments of the invention, it is possible to compare two comparand fields between themselves for equality using binary or ternary CAMs.

(a) Equality/Inequality Comparison Operation Between Two Fields

To compare if two P-bit wide fields are different, 2P entries are required in a CAM. The "different" decision is made on a search match, and the "equal" decision can be made on a no-match result (as a "non-different" decision), or on avoid entry match which is placed after the entries for the different decision. The entries in the CAM are obtained by checking the two fields, bit by bit, to see whether or not they are different. For example, for a comparison of two 4-bit wide fields, to determine if they are different, the entries to be stored in a ternary CAM are:

1xxx 0xxx

0xxx 1xxx x1xx x0xx x0xx x1xx xx1x xx0x xxx1 xxx0 xxx0 xxx1

If a search produces any match among these entries, then the two fields are different. If there is no match, then the two fields are equal.

Furthermore, if the equal decision is required to be on a match, one additional entry is sufficient for the implementation. This additional entry is a void entry after all the other entries in that group, in which all the bits are set to "don't care". In order to support this type of search and provide a search result on a match, the location of the entries, i.e., their address within the CAM is critical. CAMs generally provide a feature called: Highest Priority Match Address. This is a feature which allows the CAM to deal with a multiple match result when a search is performed. The highest priority match address in the case of multiple matches is determined according to the order of the entries in the CAM or other predetermined criteria. The CAM entries are arranged in a specific order according to the criteria of the highest match address feature, e.g. ascending or descending or other criteria. In the case of a multiple matches, which is more likely to happen if an entry with all values set to "don't care" is used, the match address corresponding to the highest priority match is provided as the result of the search. Therefore, in this case, if the 2P previous entries are stored before an entry in the form: xxxx xxxx, and if the two fields are different, then the one or several of the 2P entries and the last entry will match but the one having the highest priority in 2P entries will be returned: If, on the other hand, the two fields are equal, none of the 2P entries will match but the last entry will match. Therefore, deciding if two P-bit width fields are equal to one another, requires 2P+1 CAM entries, instead of 2P as in the case of "different" operation.

Using a binary CAM, two entries with a maximum of P search operations are needed. The comparison decision is made on the first match. The entries to be stored in the binary CAM are:

1111 0000

0000 1111

The different searches are performed with the masks:

0111 0111

1011 1011

1101 1101

1110 1110

2 entries and a maximum of 4 searches are needed to make the decision about the comparison. The decision is made on the first match result. If there is any match, then the two fields are different. If there is not match after the four searches then the two fields are equal.

Any algorithm or scanning order can be used to generate the entries and masks. It can be achieved in software, hardware or a combination of both. The following illustrates the steps for one possible implementation according to an embodiment of the invention, for generating the CAM entries and masks for implementing an equality comparison operation between two P-bit fields, assuming that the two fields are contiguous. The implementation automatically determines the CAM entries (data and mask) required for comparing two P-bit fields for equality:

For each bit of the fields, do the following:

To get a first entry, set the most significant bit in one filed to 1 and to 0 in the other field Invert the previous settings to get a second entry Set the corresponding mask bit to 0 and all the others to 1

(the same mask is used for both the current two entries)

For each bit in the fields, two entries are generated with the same mask. The masks are used when writing the values to ternary CAM memory. Masking all the corresponding bits makes the last entry for the "equal" decision.

In the case of a binary CAM, the number of entries does not depend on the precision. The entries are similar to those in the previous example (one field set to 0s while the other is set to 1s). The number of searches is equal to P, where P is the precision of each field. The masks can be generated with the same approach described above for a ternary CAM. The equal decision in this case is made on a mismatch result of all the search operations.

(b) Comparison Operations of "Greater Than" and "Less Than" Between Two Fields

In accordance with another embodiment of the invention, two fields of a comparand can be compared with each other for "greater than" and "less than" characteristics. If a P-bit field f1 has to be compared to a second field f2 to determine if f1 is "greater than" or "less than" f2 using a CAM, the same entries used to determine whether the fields are equal as described in (A) above, can be used to do magnitude comparisons between the two fields. For example, for a field precision equal to 4 (P=4), the same entries listed in (A) above can be used for "greater than" and "less than" comparisons between the two fields. Keeping the entries in the same order (according to the highest priority criteria), and assuming that the first entry is stored in an even address in the CAM, for a returned match address as a search result and in the case of a ternary CAM, it can be deduced that:

if the match address is an even address then f1 is greater than f2.

if the match address is an odd address then f1 is less than f2.

When doing such comparisons, the process has to take into account the first and last addresses as well as the location of the match address (even or odd). If the first entry has an odd address, then the decision has to be reversed, i.e. "greater than" decision for an odd match address and "less than" decision for an even match address.

FIG. 1 illustrates the generic CAM entries used in a magnitude compare operation between two fields as described above. Assuming that both fields have the same precision P, and that the first entry is at address 2k for example (even address), after a search operation the search result will be as illustrated in the Comparison Result column shown in FIG. 1. As can be seen, the result depends on match address (MA). The entries are written in the order of the example given above. The same algorithm described earlier can be used to generate the CAM entries. The three types of comparison operations, e.g., "unequal", "greater than", and "less than", can be all conducted between two fields f1 and f2 at the same time with a number of entries equal to double the field precision with a one-search operation. For the equal decision one additional entry is required, or it can be done on a mismatch result. Each address entry is representative of a number of addresses, i.e. the interval (2k≦M4<2k+2P) represents all the possible match address values. Any value for MA within this interval means that f1 is "unequal to" f2.

In the case of a binary CAM, since only two entries are needed, if the match address corresponds to the first entry, then f1 is "greater than" f2, and if the match address corresponds to the second entry, then f1 is "less than" f2. Thus, for a binary CAM implementation, only two entries are needed and the maximum number of searches required is equal to the precision of each field.

In general, the number of entries needed in a CAM for each operation is summarized in FIG. 2. It is assumed that a fixed value and the fields being compared have a precision P, with a total of M 0s (in 0-gaps), K 1-bits and N as the rank (or bit position) of the most significant bit (if counting bits from 0, i.e. 10000, N=4).

In the case of ternary CAMs, if multiple search operations are allowed (search time is not that critical), then the number of CAM entries can be reduced by changing the search mask used for each search. There is a relationship between the number of required CAM entries and the number of searches necessary to make a comparison. The following rule generalizes this relationship:

a comparison based decision requiring n CAM entries for a one search operation will require a maximum of s search operations if the number of entries is reduced to n-s entries. The sum of the number of required entries and the number of searches is less than the number of entries required with one search operation (assuming all comparison decisions are made on the first match or a mismatch).

As an example, consider the entries needed to compare two 4-bit fields (equal decision excluded). With one search operation, this decision requires 8 CAM entries. This last number can be distributed between the number of searches and the number of required entries. The decision can be made with 2 CAM entries and a maximum of 4 search operations. The CAM entries are 1111 0000 and 0000 1111. The searches are made with different masks as described earlier. In such a case, the ternary CAM is operated as a binary CAM. The result of the operation is the same as in the case of a one-search operation. FIGS. 3A and 3B present different cases for the distribution between CAM entries and the number of searches with the corresponding masks for a comparison of two 4-bit packet fields. These figures illustrate the trade-off between the number of entries and the number of searches Note that in comparing two fields with a ternary CAM, if the last entry (all "don't care" values, i.e. xxxx xxxx) corresponding to the equal decision is included, multiple searches can not be done since the last entry will match for any and all searches. Therefore, in this case the "equality" decision is now made based on a no-match result.

It is also important to note that the order of CAM entries as well as the order of the searches is important. In one embodiment, the most significant bits are compared first, going down until the least significant bit. As shown in FIGS. 3A and 3B, several equivalent solutions are available for the intermediate cases, but one of all possible bit combination is sufficient for decision implementation. The comparison decision is made at the first match result or on a mismatch.

Algorithms that can be used to generate the CAM entries can be derived from those described earlier. All entries can be first generated as in a single search operation, then merged to obtain the desired number of entries with a "merge" operation to form the reduced set of entries. The "merge" operation involves a "don't care" bit, in which case the result is equal to the value of the other bit. This property is based on the fact that there will be overlap between sets of entries when trying to merge the entries to derive a reduced set. This property is applied in order to avoid this duplication of entries. Specifically, the "merge" operation entails the following rules:

1 merge x=1

0 merge x=0 x merge x=x

It is also worth noting that in all the types of comparisons that have been discussed above, some are mutually exclusive. For example, a "greater than or equal to" and "less than" comparison to a fixed value or between two fields are exclusive. If there is not match for a "greater than or equal to" comparison, than there will be certainly a match for a "less than" comparison. These relations are the basis of the "merge" operation and can be used to reduce the number of CAM entries by selecting the best type of comparison to perform a decision (i.e.: a comparison that requires fewer CAM entries and fewer searches).

Although the description of comparing operations on two fields has thus far focused on two fields having an equal precision, i.e. an equal number of bits P, it should be understood that a general case between two fields of unequal bit length can also be performed using the concepts described. Specifically, for two fields where one field has a greater bit length than the other, the comparison process can be divided into two main steps: comparing on a bit-wise basis, the bits which are of the same rank (starting from the least significant bit, for example) and then considering all the possible cases of the extra bits in the wider bit field. For example, for a comparison between two fields f1 and f2 where f1 has P bits and f2 has S bits, and for simplicity, let P=8 and S=4, then the entries necessary to perform "greater than" operation would be as follows:

| entry# | f1 | f2 |
|--------|----------|-------|
| i | 1xxxxxx | xxxx |
| i + 1 | x1xxxxxx | xxxx |
| i + 2 | xx1xxxxx | xxxx |
| i + 3 | xxx1xxxx | xxxx |
| i + 4 | 00001xxx | 0xxx |
| i + 5 | 00000xxx | 1xxx |
| i + 6 | 0000x1xx | x0xx |
| i + 7 | 0000x0xx | x1xx |
| i + 8 | 0000xx1x | xx0x |
| i + 9 | 0000xx0x | xx1x |
| i + 10 | 0000xxx1 | xxx0 |
| i + 11 | 0000xxx0 | xxx1 |

As can be seen, 12 entries or P+S entries are required. The first four entries cover some cases where f1 is "greater than" f2. The remaining entries are similar to the case where the precision of f1 is "equal to" that of f2. The same entry types were described earlier in the case of two fields of equal width.

If a comparison f1<f2 is to be performed, the needed entries are those from rank I+4 till I+11, as in the case where the precision of f1 and f2 are the same and equal to S (2S entries).

Multiple Comparisons in One CAM Entry

If multiple independent comparisons are combined, for example, if four fields of a comparand f1, f2, f3 and f4 are part of a CAM entry and the comparisons: (f1 greater than f2) and (f3 less than f4) have to be performed, then the number of required CAM entries grows very rapidly. In such multiple comparison cases, the number of entries needed is equal to the product of the number of entries needed for each individual comparison. This number can be reduced by two approaches.

Multiple searches: the preceding example requires two successful search operations with the number of entries being equal, to the sum of the individual comparisons. If the decisions are not mutually exclusive and have an intersection domain, then the decision resulting from the intersection of the individual decisions can be implemented.

Equivalent decisions: the previous comparison combination is equivalent to a no-match for the decision: (f1 less than f2) or (f3 greater than f4), which requires fewer CAM entries. An "or" combination corresponds to the sum of the entry numbers of the individual entries, while an "and" combination corresponds to the multiplication of the individual entry numbers.

There is no general rule for reducing the CAM entries for such combinations. The number of CAM entries required is tightly dependent on the nature of the combinations.

Packet Classification Embodiment

A packet classification implementation example using a ternary CAM to implement the above mentioned basic comparisons will now be described. As described earlier, communication networks must provide users with a variety of services with differing quality of service (QoS), class of service (CoS) and other parameters. Packet classification is an important step in providing such services appropriately tailored to user's needs. Generally, packet classification is performed on routers and switches. Packets requiring high quality of service are given highest priorities by assigning them to the corresponding queues in the router or switch. Classification algorithms are traditionally implemented in software using binary trees or other search techniques. As network traffic increases however and the requirement to support more and more protocols, packet processing power and flexibility is increasing at a rate which will soon render the software based solutions ineffective.

Packets are classified according to values contained within their headers, which indicate their protocol type and other related information. CAMs have been used in the recent past for exact matching purposes, i.e. comparing packet headers to fixed stored CAM entries and providing an exact match or mismatch search result. However, no previous approaches have described using a CAM to perform both exact matching and magnitude matching for data network applications.

In the following example, the classification is based on the header of a sample data stream. As shown in FIG. 4, the header has four fields F1, F2, F3 and F4 with bit-width of 3, 3, 4 and 2 bits respectively.

Figure 5:
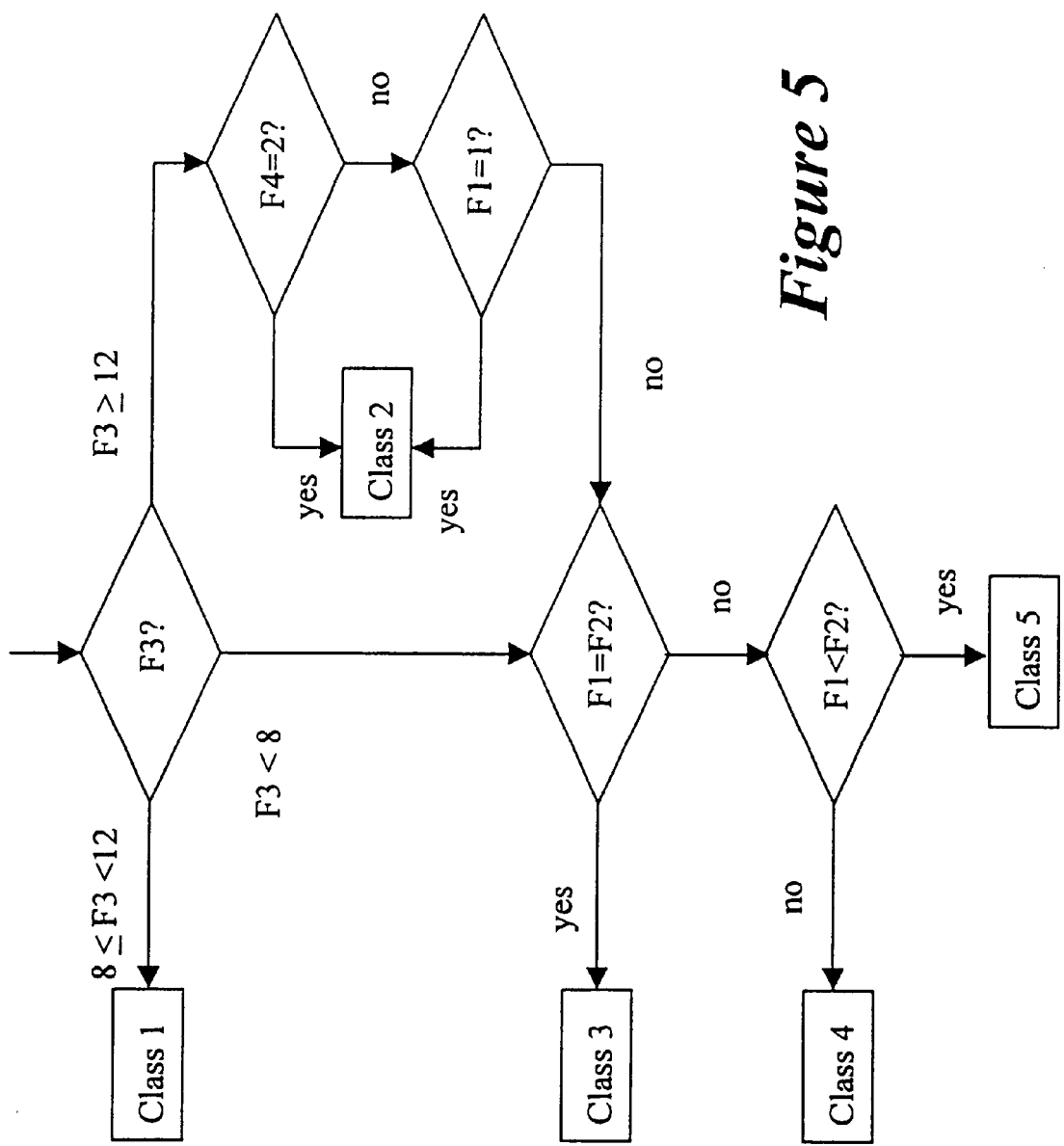
FIG. 5 is a packet classification tree flow chart which is used to illustrate a classification process according to one embodiment of invention.

The flowchart shown in FIG. 5 outlines the basic packet classification decision flow. First F3 is checked to determine whether it its between 8 and 12. If this is the case, then the class of the packet is class 1. If the field F3 is "greater than or equal to" 12 and F4 is "equal to" 2, then the packet is of class 2. The packet is of the same class (class2), if F3 is "greater than or equal to" 12, F4 is "unequal to" 2 and F1 is "equal to" 1. A packet is of class 3, if F3 is "less than" 8 and F1 is "equal to" F2, or if F3 is "greater than or equal to" 12, F4 is "unequal to" 2, F1 is "unequal to" 1 and F1 is "equal to" F2. A packet is in Class 4 if F3 is "less than" 8 and F1 is "unequal to" F2 and F1 is "greater than or equal to" F2 or if F3 is "greater than or equal to" 12, and F4 is "unequal to" 2 and F1 is "unequal to" 1 and F1 is "unequal to" F2 and F1 is "less than" F2. Finally, a packet will be in class 5 if F3 is "less than" 8 and F1 is "unequal to" F2 and F1 is "less than" F2 or if F3 is "greater than or equal to" 12, and F4 is "unequal to" 2 and F1 is "unequal to" 1 and F1 is "unequal to" F2 and F1 is "less than" F2.

A ternary CAM with one-search operation is used to store the entries for this example, but a binary CAM may also be used with multiple search operations. Once the CAM is initialized, incoming packets are searched and compared to the contents of the CAM and a decision is made on the search result. The ternary CAM entries are generated according to the different comparisons as was described earlier.

The CAM entries corresponding to the different individual comparisons are shown in FIG. 6. The values shown in the second column are the values for the individual fields.

FIG. 7 illustrates the ternary CAM entries for the flowchart of FIG. 5. The addresses are shown in the first column, while the actual entries corresponding to F1, F2, F3 and F4 are shown in the second column, representing values corresponding to the packet header shown on FIG. 3. Column 3 illustrates the different classes corresponding to the match addresses, and can be stored as associated data in an associated memory (SRAM for example).

It is worth noting that, the two comparisons F1=F2 and F1<F2 are done with the same set of entries. Because two paths are possible to reach these comparisons in the flowchart, the set of, entries 1s stored two times. One time with the entry corresponding to the comparison F3<8 and one time with the entry corresponding to F3>12.

The second column represents the initialization CAM content. Once this initialization has taken place, during normal CAM operation, for each incoming packet, the header is searched in the ternary CAM without using a mask, and the match address directly provides the class of the packet In this implementation there will be always a match, all the possible values are covered by the shown entries. It is worth noting that the classification uses the highest priority match address features supported by most CAMs. In FIG. 6, the highest priority entry corresponds to the entries with the lowest address. Any criteria can be used as long as the order of the entries is done according to the highest priority criteria.

The basic concept can be applied to many areas in which comparison operations between two data are needed. The specification describes in detail the basic concept of the invention as well as its applications in the field of network communications where packets of digital data are classified or parsed according to some criteria.

What is claimed is:

1. A method of generating data entries to be written in a storage medium which supports a comparison-type operation between two fields within a group of digital bits, one field being P binary bits long, the other being S binary bits long and P and S being positive integers, comprising steps of:
   identifying a comparison-type indicator indicating the type of comparison operation; and
   generating a set of data entries of at least P+S bits long to be written in response to the comparison-type indicator, each of the data entries comprising two subentries of at least P and S bits long respectively,
   wherein P>S, and each of the data entries comprises a first subentry having at least P bits and a second subentry having at least S bits, the first subentry having S bits which is equal or unequal to the S bits of the second subentry depending on a comparison-type indicator.

2. The method of generating data entries to be written in a storage medium as described in claim 1 wherein the storage medium is a binary CAM and the method comprises further steps of:
   generating one or more masks for searching the binary CAM according to the comparison-type indicator.

3. The method for generating data entries to be written in a storage medium as described in claim 1 in which the storage medium is a ternary CAM and the step of generating data entries includes a step of writing some "don't care" bits in some of the sub entries according to the comparison-type indicator.

4. A The method for generating data entries to be written in a storage medium as described in claim 2 in which the type of comparison operation includes one field being "greater than", "less than" "equal to", "greater than or equal to" and "less than or equal to" the other field.

5. The method for generating data entries to be written in a storage medium as described in claim 3 in which the type of comparison operation includes one field being "greater than", "less than" "equal to", "greater than or equal to" and "less than or equal to" the other field.

6. A method of determining a comparison relationship between two fields within a group of digital bits, one field being P binary bits long, the other being S binary bits long and P and S being positive integers, comprising steps of:
   searching a storage medium and comparing the group of digital bits to generate a result which includes a match, a multiple match and no match, the storage medium comprising one or more data entries in a specific order, each data entry being made up of two subentries of at least P and S binary bits long respectively; and
   determining the comparison relationship between the two fields from the result of the searching step,
   wherein P>S and each of the data entries comprises a first subentry having at least P bits and a second subentry having at least S bits, and the first subentry having S bits which is equal or unequal to the S bits of the second subentry depending on the comparison-type indicator.

7. The method of determining a comparison relationship between two fields according to claim 6 wherein the storage medium is a ternary CAM and each of the memory entries may contain "don't care" bits, the step of searching comprises performing one search and compare operation which produces a result including a match, a multiple match and no match and in the case of a multiple match, the comparison relationship is determined from the specific order of stored antics in the ternary CAM and the match address result in which form the multiple match result which is returned.

8. The method of determining a comparison relationship between two fields according to claim 6 wherein the storage medium is a binary CAM and the step of searching comprises a plurality of ordered search operations, each operation using a different predetermined mask.

9. The method of determining a comparison relationship between two fields according to claim 8 wherein if one search operation produces a match, the comparison relationship is determined from the specific order of the stored entries in the binary CAM and the match address result which is returned.

10. The method of determining a comparison relationship between two fields according to claim 6 wherein the comparison relationship to be determined is any of magnitude comparison relationships which include one field being "greater than or equal to" another, "less than" another and "equal to" another.

11. The method of determining a comparison relationship between two fields according to claim 7 wherein the comparison relationship to be determined is any of magnitude comparison relationships which include one field being "greater than or equal to" another, "less than" another and "equal to" another.

12. The method of determining a comparison relationship between two fields according to claim 9 wherein the comparison relationship to be determined is any of magnitude comparison relationships which include one field being "greater than or equal to" another, "less than" another and "equal to" another.

13. An electronic system for determining a comparison relationship between two fields of a group of digital bits, each field being P and S binary bits long respectively and P and S being positive integers, comprising:
   a module for reading the two fields of the group of digital data bits;
   the storage medium storing one or more data entries relating to the group of digital bits in a specific order, each data entry being made up of two subentries of at least P and S binary bits respectively;
   a search mechanism for searching the storage medium,
   a storage medium reading mechanism for obtaining the result of no match, a match or a multiple matches with the matched address among to data entries and their memory addresses, and a determining mechanism for determining the relationship between the two fields from the results, wherein P>S and each of the data entries comprises a first subentry having at least P bits and a second subentry having at least S bits, and the first subentry having S bits which is equal or unequal to the S bits of the second subentry depending on the comparison-type indicator.

14. The electronic system for determining a comparison relationship between two fields of a group of digital bits according to claim 13 wherein there is one additional data entry which is made up of two subentries, both having P "don't care" bits.

15. The electronic system for determining a comparison relationship between two fields of a group of digital bits according to claim 13 wherein the storage medium is a binary CAM and the search mechanism further includes one or more different masks, each having a predetermined different bit patterns.

16. The electronic system for determining a comparison relationship between two fields of a group of digital bits according to claim 13 wherein the storage medium is a ternary CAM and each of the memory entries may include at "don't care" bits.

17. The electronic system for determining a comparison relationship between two fields of a group of digital bits according to claim 16 wherein the search mechanism includes one or more different masks.

18. A method of comparing a value with a reference value, comprising steps of:

searching a storage medium for the value to generate a result which includes a match and no match, the storage medium having one or more entries, each data entry being generated dependent on a comparison-type indicator and a bit pattern of the reference value, and determining the comparison relationship between the value and the reference value according to the result of the searching step, wherein the comparison-type indicator is "greater than", "less than", "greater than or equal to", or "less than or equal to".

19. The method of comparing a value with a reference value as defined in claim 18, wherein the storage medium is a binary CAM and the step of searching comprises the step of using a mask.

20. The method of comparing a value with a reference value as defined in claim 18, wherein the storage medium is a ternary CAM.

21. The method of comparing a value with a reference value as defined in claim 18, wherein the storage medium is a ternary CAM and the step of searching comprises the step of using a mask.

22. The method of comparing a value with a reference value as defined in claim 18, wherein the bit pattern of the reference value is "one 1 with all remaining 0s", "contiguous 1's with no 0-gaps" or "blocks of one or more 1's with one or more 0-gaps".

* * * * *

UNITED STATES PATENT AND TRADEMARK OFFICE
CERTIFICATE OF CORRECTION

PATENT NO.     : 6,697,803 B2
DATED          : February 24, 2004
INVENTOR(S)    : Mourad Abdat It is certified that error appears in the above-identified patent and that said Letters Patent is hereby corrected as shown below:

Column 4,
Line 37, please delete ";" after "application" and replace with -- , --

Column 6,
Line 11, please delete "x1xxxxxxxxxxxxx" and replace with -- xlxxxxxxxxxxxxxx --

Column 8,
Line 30, delete "[1280, 14071]" and replace with -- [1280, 1407] --

Column 9,
Line 22, please delete the "." after "generating"
Line 58, delete "bit to]" and replace with -- Bit to 1 --.
Line 61, delete second occurrence of "significant])" and replace with
-- significant 1) --
Line 67, please delete "," after the word "to"

Column 10,
Line 1, please delete "." after the word "in"
Lines 7-26, should be shown as:

> Determine the rank (K) (or bit position) of the most significant bit in V
>
> Determine the number of significant 0s in V (i.e. to the right of the most significant 1 bit)
>
> Generate the first entries by setting one-by-one the bits between K+1 and P (inclusive) to 1 (the other bits will be masked)
>
> Generate the corresponding masks by setting one-by-one the bits between K+1 and P (inclusive) to 0 and all the other bits to 1
>
> Generate the remaining entries by scanning bit-by-bit, the 0 bits between the most significant 1 and the least significant bit of V, setting that 0 to 1 and keeping the original values of the bits of V between modified one and the most significant 1 in V
>
> Generate the corresponding masks for the previous entries by setting the bits from the most significant 1 of V to the current modified bit to 0, and all the other bits to 1
>
> Adjust the entries if the equal decision is included in the comparison

UNITED STATES PATENT AND TRADEMARK OFFICE
CERTIFICATE OF CORRECTION

PATENT NO. : 6,697,803 B2
DATED : February 24, 2004
INVENTOR(S) : Mourad Abdat

It is certified that error appears in the above-identified patent and that said Letters Patent is hereby corrected as shown below:

Column 11,
Lines 6 to 12, should be shown as:

> Generate an intermediate bit_val having a "1" in the same rank position as the current rank (rank of the current "1" and all other bit set to "0" (can be accomplished by shifting in a single "1" from the least significant bit to the rank of the current "1" being considered)
>
> Set the current CAM entry to the result of the V-bit_val
>
> Set the current mask to the result of bit_val-1.

Line 24, please delete "0...010000000000 (bit_ val)" and replace with
--0...010000000000 (bit_val))
Line 46, please delete "avoid" and replace with -- a void --
After line 56, insert the following; -- xx0x xxlx --

Column 12,
Lines 51 to 57, should be shown as:

> For each bit of the fields, do the following:
>  To get a first entry, set the most significant bit in one filed to 1 and to 0 in the other field
>
>  Invert the previous settings to get a second entry
>
>  Set the corresponding mask bit to 0 and all the others to 1
>
> (the same mask is used for both the current two entries)

Column 15,
Line 11, please delete "fi" and replace with -- f1 --
Line 51, please delete ","

Column 17,
Line 4, please delete "F3 > 12" and replace with -- $F3 \geq 12$ --

Line 10, after "packet" please insert -- . --
Line 54, please delete "A"

UNITED STATES PATENT AND TRADEMARK OFFICE
CERTIFICATE OF CORRECTION

PATENT NO. : 6,697,803 B2
DATED : February 24, 2004
INVENTOR(S) : Mourad Abdat

It is certified that error appears in the above-identified patent and that said Letters Patent is hereby corrected as shown below:

<u>Column 18,</u>
Line 22, please delete "antics" and replace with -- entries --
Line 66, please delete "to" and replace with -- the --.

Signed and Sealed this

Twelfth Day of April, 2005

JON W. DUDAS
*Director of the United States Patent and Trademark Office*

UNITED STATES PATENT AND TRADEMARK OFFICE
CERTIFICATE OF CORRECTION

PATENT NO. : 6,697,803 B2
DATED : February 24, 2004
INVENTOR(S) : Mourad Abdat

It is certified that error appears in the above-identified patent and that said Letters Patent is hereby corrected as shown below:

Column 17,
Line 4, please delete "F3 > 12" and replace with -- $F3 \geq 12$ --

Signed and Sealed this

Seventh Day of June, 2005

JON W. DUDAS
*Director of the United States Patent and Trademark Office*